June 19, 1951  E. C. INGRAHAM  2,557,659

DYNAMIC BALANCE INDICATING SYSTEM

Filed Nov. 13, 1945

INVENTOR
ELMER CLARK INGRAHAM

BY *Ralph L. Chappell*

ATTORNEY

Patented June 19, 1951

2,557,659

UNITED STATES PATENT OFFICE 2,557,659

DYNAMIC BALANCE INDICATING SYSTEM

Elmer Clark Ingraham, Cambridge, Mass., assignor, by mesne assignments, to the United States of America as represented by the Secretary of the Navy Application November 13, 1945, Serial No. 628,285

2 Claims. (Cl. 73—66)

This invention relates to methods and apparatus for the dynamic balancing of rotors and, more particularly, to methods and apparatus for the dynamic balancing of rotors using a centrifugal balance indicator.

If the out-of-balance of a rotor is known, it is a simple matter to add or subtract weight at the proper point on the rotor to make its true axis coincide with its mechanical axis. Numerous expensive and complicated devices for determining this offset or out-of-balance have been used, but these devices were frequently unsatisfactory because of their complications and long tedious processes necessary to determine the out-of-balance of a rotor.

It is an object of my invention to provide a centrifugal balance indicator to determine the out-of-balance of a rotor.

It is a further object of my invention to provide a simple and inexpensive centrifugal balance indicator.

Other objects and advantages of this invention will be apparent from the following description and drawings in which.

Figure 1:
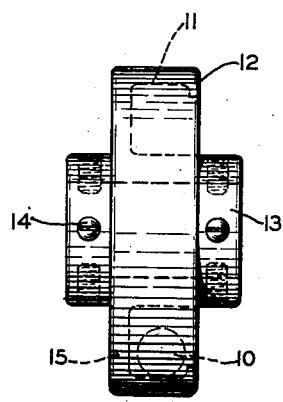
Fig. 1 is a side view of an embodiment of my invention.

In Fig. 1 is disclosed a centrifugal balance indicator which comprises a ball 10 free to roll in an annular ball race 11, a retaining flange 12 around ball race 11 as shown, a hub 13 with recessed adjusting screws 14 in it, and a web 15 connecting hub 13 to ball race 11. All cylindrical surfaces are concentric and the radial surfaces are perpendicular to the axis of hub 13.

Figure 2:
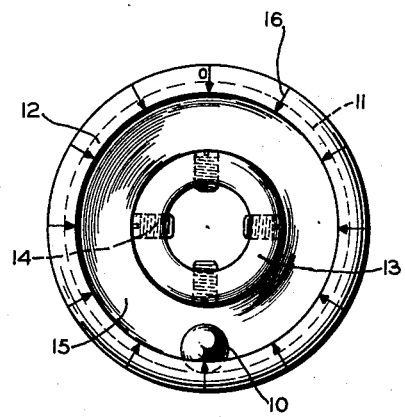
Fig. 2 is a front view of the same embodiment.

In Fig. 2 are shown graduated index marks 16 on the face of retaining flange 12 and race 11.

Figure 3:
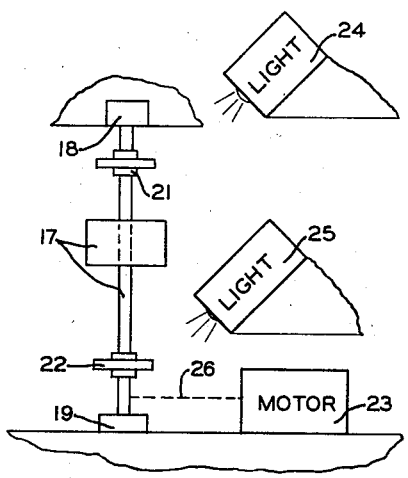
Fig. 3 illustrates a method using my invention whereby the out-of-balance and the relationship of the true axis to the mechanical axis of a rotor may be obtained.

Referring to Fig. 3 a method of dynamically balancing a rotor 17 by means of my invention is disclosed. The rotor 17 is "floated" in its own bearings 18 and 19, as by rubber suspension. Attached to rotor 17 near each end are two centrifugal balance indicators 21 and 22. The rotor is rotated by a motor 23 through a mechanical linkage represented by dotted line 26. Arranged to project light on centrifugal balance indicators 21 and 22 are two variable frequency stroboscopic lights 24 and 25, whose frequency is adjusted to that of the rotor.

Ball 10 may be considered as a continuously variably positioned test weight whose motion is restricted by race 11 and retaining flange 12 so that its path is concentric with the rotor to be balanced. Adjusting screws 14 are used to attach and adjust hub 13, and thus race 11, so that it is concentric with the rotor to be balanced.

To balance a rotor using my invention, the rotor is first "floated" in its own bearings so that it can be rotated on its mechanical axis but is free to find and rotate on its own true axis. A centrifugal balance indicator is mounted on and is adjusted so that it is concentric with each end of the rotor shaft. Under synchronized stroboscopic light the motion is stopped and the position of the ball relative to its race can be seen. If the rotor is unbalanced when rotated at a sufficient speed to cause it to seek and rotate on its own true axis, due to centrifugal force acting on it, the ball will come to rest relative to its race. If the rotor is balanced when rotated, the ball will not come to rest in its race but will continue to move.

When the rotor is rotated in its own bearing at a speed sufficient to cause it to seek and rotate on its own true axis, each end of the rotor's mechanical axis and therefore each indicator assumes the motion of a simple eccentric cam, provided that the rotor is unbalanced and its true axis does not coincide with its mechanical axis. This speed is higher than what is usually referred to as the "critical speed." The "critical speed" of a rotor may be defined as that speed just sufficient to cause the rotor to seek and rotate about its true axis instead of about its apparent geometric axis. Due to centrifugal force acting on it, the ball in each indicator seeks and comes to rest relative to its race and therefore to the rotor, at a point which is farthest from the true axis of the rotor. By observation under stroboscopic light the positions of these points relative to the index marks on the retaining flange and thus to the rotor may be easily obtained. In each indicator the ball will assume a position on that side of the indicator corresponding to the lighter side of the body so as to act in itself as a weight tending to balance the rotating system. These points determine diameters at either end through which both the true and mechanical axis pass. From the knowledge of the relative location of the two axes, suitable points for weight adjustments are obtained. Trial weights are then attached at these points and a second determination is made. An extrapolation of these two tests with knowledge of the eccentricity of the above-mentioned motion will very accurately reveal the additional weight shifting required to obtain dynamic balance.

The invention is to be limited only by the appended claims.

What is claimed is:

1. A centrifugal balance indicating system for a rotor comprising an indicator, said indicator comprising, a ball, a ball race, a retaining flange on and concentric with said race, a hub concentric with said race, adjusting screws in said hub to attach and to position said hub so that it is concentric with said rotor, and a web connecting said hub to said race, said retaining flange being graduated with index works, said ball being free to rotate in said race with minimum friction, whereby as said rotor, with said hub attached and properly positioned is rotated in its own bearings at a speed sufficient to cause said rotor to seek and rotate on its own true axis, said ball, due to centrifugal force acting thereon, seeks and comes to rest, with said rotor unbalanced, relative to said race at that point farthest from said true axis of said rotor and means for intermittently illuminating said indicator at a frequency synchronous with the frequency of rotation of said rotor.

2. A dynamic balance indicating system for a rotor comprising in combination means for mounting said rotor whereby said rotor is rotatable about its own mechanical axis and is adapted to seek and rotate about its own true axis, said mounting means comprising bearings for each end of the shaft of said rotor mounted in resilient material, a first and second indicator mounted on said shaft concentrically of said rotor and on either side of said rotor, each of said indicators comprising a ball race, a ball, said ball being free to rotate in said race, a hub concentric with said race, adjusting screws on said hub on both sides of said ball race for attaching and positioning said hub concentrically of said rotor, a web connecting said hub to said race, a retaining flange secured to said race, said retaining flange being graduated with index marks, means for rotating said rotor, and illuminating means for periodically illuminating said indicators, the frequency of said periodic illumination being adjusted to be synchronous to the frequency of rotation of said rotor, said illuminating means being adapted to simultaneously illuminate said ball and said flange of each of said indicators.

ELMER CLARK INGRAHAM.

REFERENCES CITED

The following references are of record in the file of this patent:

UNITED STATES PATENTS

| Number | Name | Date |
|---|---|---|
| 1,876,524 | Thearle | Sept. 6, 1932 |
| 1,949,603 | Davey | Mar. 6, 1934 |

FOREIGN PATENTS

| Number | Country | Date |
|---|---|---|
| 400,880 | Great Britain | Nov. 2, 1933 |
| 419,282 | Great Britain | Nov. 8, 1934 |
| 532,828 | Germany | Sept. 8, 1931 |